United States Patent Office 2,713,575
Patented July 19, 1955

2,713,575

PROCESS OF REACTING GELATIN AND OXIDIZED CASEIN WITH AMYL CHLOROFORMATE

John W. Gates, Jr., and Herbert S. Elins, Rochester, N. Y., assignors to Eastman Kodak Company, Rochester, N. Y., a corporation of New Jersey No Drawing. Application April 1, 1952,
Serial No. 279,936

2 Claims. (Cl. 260—117)

This invention relates to derivatives of proteins in general and gelatin in particular prepared by reacting the protein with a chloroformic acid ester. Proteins generally and gelatin in particular have been known for several decades and have been found to be useful for various applications. These applications, particularly in the case of gelatin, have made use of either the solubility characteristics, the possession of an isoelectric point or the water swelling characteristics as being applicable to a particular use. Sometimes in the uses of proteins or of gelatin it has been desirable to alter the characteristics thereof by treatments, some of which are chemical in nature. For instance, the isoelectric point of gelatins can often be varied by preparing the derivative thereof.

One object of our invention is to prepare derivatives of proteins. Another object of our invention is to prepare protein compounds having different characteristics than those of either of the compounds employed in their preparation. A further object of our invention is to prepare derivatives of gelatin having different characteristics than those of gelatin itself. A still further object of our invention is to prepare new compounds from proteins and chloroformic acid esters. Other objects of our invention will appear herein.

We have found that proteins will react with chloroformic acid esters under alkaline conditions whereby the physical characteristics of the protein are changed, for example, in the isoelectric point, the solubility and the coagulability thereof. The products of our invention are prepared by reacting an aqueous dispersion of the protein with a chloroformic acid ester at an alkaline pH. The reaction is found to proceed most satisfactorily at a pH of 9–11 and at a temperature within the range of 30–50° C., but the reaction may be conducted at any temperature which is sufficient to retain the protein in solution and at a pH between 7 and 12. In the case of the most reactive of the chloroformic acid esters, it is desirable to maintain the temperature at the lowest possible to retain the protein in solution. In some cases it may be desirable to add alkali from time to time during the course of the reaction to maintain a fairly constant pH, particularly if the pH originally present is in the low part of the pH range. After the reaction has been completed (sometimes in as little as ½ hour), the protein compound may be recovered by adding acid to lower the pH to less than 7, followed by setting the mass by cooling and washing free from salts with cool water.

The chloroformic acid esters which may be employed in reacting with proteins in accordance with our invention may be represented by the formula

in which R may represent alkyl, arylalkyl, alkoxyalkyl, polyalkoxyalkyl, aryloxyalkyl or an alicyclic group. In view of the fact that the lower alkyl esters of chloroformic acid are vigorously reactive, it is desirable that the esters of the higher alkyls, such as of from 5 to 10 carbon atoms or more, be used. In the case of the chloroformic acid esters of lower alcohols, such as, for instance, ethyl chloroformate or methyl chloroformate, it is convenient to slowly add the ester to the warmed protein solution over a period of time whereby the reaction is controlled. Other groups which may be employed as the R substituent to form the chloroformic acid ester are benzyl, methoxyethyl, methoxypropyl, phenoxyethyl, phenoxypropyl, methyl or ethyl Cellosolve, cyclohexyl and cyclopentyl.

Although our invention is directed to the preparation of gelatin derivatives, other derivatives of proteins, such as of casein, soy protein, blood albumin or the like, may be prepared in accordance with our invention. The reaction, as described herein, is carried out in an aqueous dispersion, such as in water, water-acetone, water-formamide, water-dioxane or the like. In the reaction involved, the chlorine of the chloroformic acid ester combines with the hydrogen of an amino or possibly a hydroxyl group of the protein whereby the group that attaches itself to the protein is

Gelatin derivatives prepared in accordance with our invention are generally useful in capacities in which gelatin has previously been used, but with the difference that varied properties are found. These derivatives are useful as peptizing agents in preparing silver halides in dispersed form. Also, these derivatives may be employed in lithographic printing processes for preparing silver halide dispersions, as a vehicle for the silver halide in photographic emulsions or in imbibition processes in photography.

The following examples illustrate the preparation of protein derivatives in accordance with our invention.

*Example 1*

186 parts of gelatin were dissolved in 2,000 parts of water and the pH was adjusted to 9.5 with dilute aqueous alkali, the solution being at a temperature within the range of 100–120° F. The solution was treated 90 minutes with 14 parts of n-amyl chloroformate added dropwise to the vigorously agitated dispersion. The temperature and pH were held constant during the addition period and for 30 minutes thereafter. At the end of this time the mixture was acidified with dilute mineral acid to a pH of 6, and it was chilled to set the mass, then shredded, washed and dried. A yield of 192 parts of the gelatin derivative of chloroformic acid ester was obtained.

*Example 2*

186 parts of casein were dispersed in 1800 parts of water at 140° F., and the pH was adjusted to 10.5 with dilute aqueous alkali. 26 parts of 30% aqueous hydrogen peroxide was added to oxidize the casein in accordance with the method described in application Serial No. 768,480 of Lowe and Gates, filed August 13, 1947 which matured into U. S. Patent 2,691,582. The temperature of 140° F. and the pH of 10.5 were maintained for 2 hours while stirring the mixture. The pH was then adjusted to 9.5, and 14 parts of n-amyl chloroformate were added dropwise over a period of 90 minutes, the pH having been maintained at 9.5 by occasional additions of dilute aqueous alkali and the temperature held at 140° F. The mass was stirred for an additional 30 minutes until the addition of the ester was complete, and it was then slowly acidified to a pH of 4.2 with dilute sulfuric acid which coagulated the casein derivative. This derivative was washed with distilled water 3 times by decantation, resolubilized at a pH of 10.5 and again precipitated by lowering the pH to 4.2. It was again washed thoroughly with distilled water and redispersed at a pH of 6 in sufficient distilled water to make a 10% solution by weight of the derivative.

We claim:

1. A method of preparing an alkyl chloroformate derivative of a protein which comprises reacting upon an aqueous solution of protein selected from the group consisting of gelatin and oxidized casein with amyl chloroformate at a pH of 9–11 and at a temperature of 30–50° C. whereby reaction occurs between the protein and the amyl chloroformate.

2. A method of preparing an amyl chloroformate derivative of gelatin which comprises reacting upon a gelatin in aqueous solution with amyl chloroformate at a pH of 9–11 at a temperature of 30–50° C. whereby reaction occurs between the gelatin and the amyl chloroformate.

References Cited in the file of this patent

UNITED STATES PATENTS 2,518,666   Damschroder et al. _____ Aug. 15, 1950

FOREIGN PATENTS 425,370   Great Britain _____ Mar. 13, 1935

OTHER REFERENCES

Anson et al., "Advances in Protein Chem.," vol. III, p. 196 (1947).

Anson et al., Advances in Protein Chem.," vol. 5, 1949, Academic Press, Inc., New York, N. Y., page 21.

Gaunt et al., Nature, vol. 136, pp. 438–9, 1935.

Gaunt et al., Biochem. J., vol. 33, pp. 908–9, 1939.